June 13, 1933.  E. O. COREY  1,914,325
TERMINAL CHECK VALVE
Filed Sept. 6, 1929
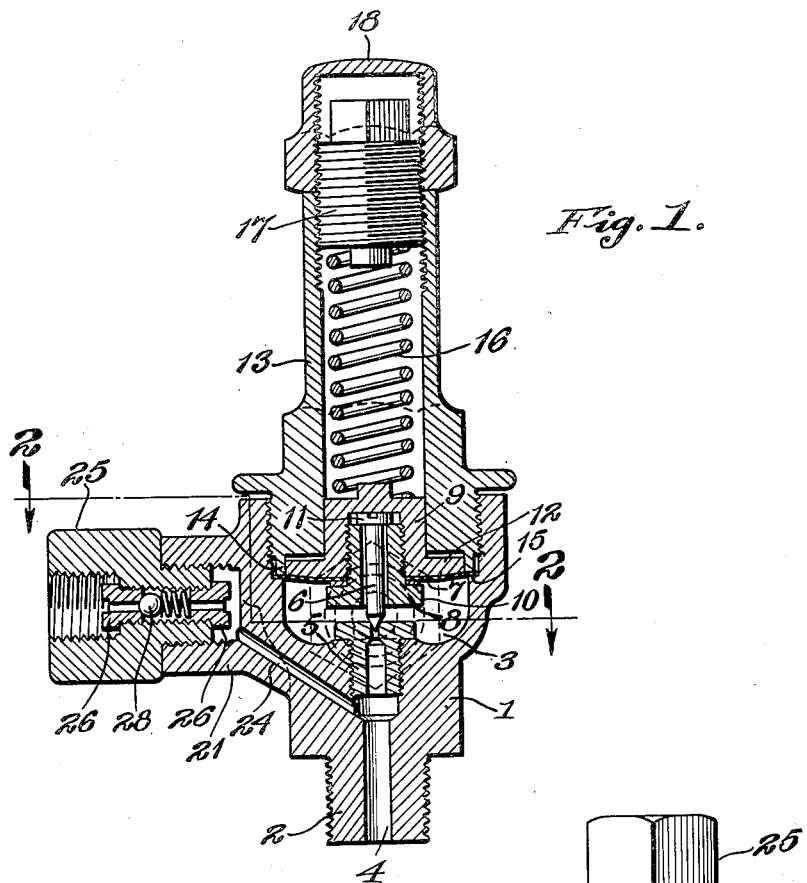
Fig. 1.
Fig. 2.
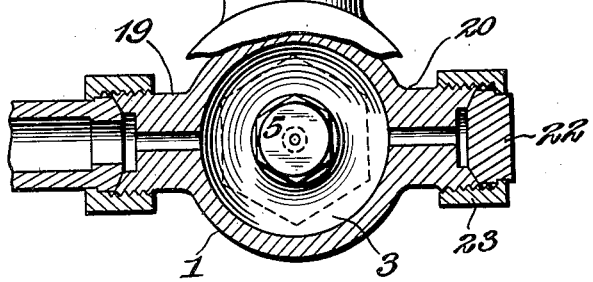
INVENTOR
Elmer O. Corey
BY
Word & Word
ATTORNEYS Patented June 13, 1933

1,914,325

UNITED STATES PATENT OFFICE

ELMER O. COREY, OF NORWOOD, OHIO, ASSIGNOR TO THE EDNA BRASS MANUFACTURING COMPANY, OF CINCINNATI, OHIO, A CORPORATION OF OHIO

TERMINAL CHECK VALVE

Application filed September 6, 1929. Serial No. 390,822.

This invention relates to improvements in valves of a type known as terminal check valves used in force feed lubricator systems particularly as applied to steam locomotives. These valves are always located in the delivery end of the oil delivery pipes or conduits for intermittently delivering oil under pressure and against a resistant pressure. For locomotive uses the terminal check valve is always applied to the steam cylinder or steam pipes to force the oil into the cylinder and valves at a pressure in excess of the steam pressure in the cylinder or valve. The oil is supplied to the check valve by a pump and to a chamber of the check valve, and when the oil in the chamber rises to a predetermined amount the valve is opened to forcibly discharge a quantity of the oil from the chamber.

A pin or needle valve as a part which controls the discharge of oil from the oil chamber through a relatively small port or passage, is fixed to a diaphragm which is exposed to the oil pressure in the oil chamber for unseating the valve and against the pressure of a spring or other pressure applied against the opposite side of the diaphragm for holding the needle valve seated until the pressure in the oil chamber rises to a predetermined point. The needle valve when seated exposes a comparatively small area to the pressure in the cylinder which is negligible toward influencing the operation of the valve. It is desirable that the diaphragm be very sensitive to slight variations in pressure against relatively opposite sides so as to readily yield for opening or closing the needle valve. Considerable trouble has been experienced with the diaphragm either to breakage or becoming set, destroying its efficiency and reliability of operation.

It is therefore an object of the invention to provide a diaphragm structure for terminal valves in which the diaphragm offers greater efficiency, is not easily distorted, very sensitive to the prevailing pressures against either of the opposite sides of the diaphragm and insure a greater life.

Another object of the invention is to provide a terminal check valve with a diaphragm normally dished when the valve is closed and in full bearing contact at one side with a movable convex wall or surface so as not to be strained or move across the shearing edge when yielding in a direction to open the valve.

Another object of the invention relates to the method of initially setting the diaphragm within the body of the valve so as to have the same assume a dished formation when the valve is seated.

Another object of the invention is to provide means for admitting steam under pressure or otherwise to the oil discharge passage or conduit of the valve for atomizing or spraying the same into the end of the cylinder-steam pipe or valve chamber into which the oil is discharged.

Other objects and certain advantages will be more fully set forth in a description of the accompanying drawing, forming a part of this specification, in which:

Figure 1 is a central vertical section of the improved terminal check valve, showing the valve in its normally closed position.

Figure 2 is a section on line 2—2, Figure 1.

Referring to the drawing, 1 indicates the body of the valve having a depended threaded nipple 2 for connecting the valve to the part to which the lubricant is to be supplied. The body provides an oil chamber 3 communicating with a valve control passage 4 through said nipple. The upper portion of the passage 4 is counterbored and threaded to receive a removable or hardened valve seat thimble 5 having a restricted port therethrough connecting the chamber 3 and passage 4, and controlled by a pin or needle valve 6 seating into the upper end of the thimble.

The needle valve 6 is secured to a diaphragm 7. The diaphragm is marginally seated and clamped within the body and provides a flexible support for the valve and closure for the chamber 3. The stem of the valve is engaged through a central bore of a flanged bushing 8 extending through the diaphragm and threaded into a follower 9 engaged against the upper side of the diaphragm while the flange 10 of the bushing engages the diaphragm at an opposite side from the follower for clamping the parts together.

The valve is provided with a head 11 engaged between the bushing and follower, thus the valve, diaphragm, bushing and follower are combined as a unit. The follower is counterturned to provide an annular flange 12 having a convex face bearing against the diaphragm, equal to the entire exposed part of diaphragm in chamber 3, and slides within a recess in the lower end of a bonnet or spring case 13 screw-threaded into the body.

The bonnet at its lower end is provided with an annular rim portion 14 marginally bearing against the diaphragm for clamping the diaphragm marginally against an annular shoulder 15 in the body. The bonnet is of sleeve or tubular form for housing a spring 16, one end engaging against the follower and its opposite end against a screw plug 17 screw-threaded into the upper end of the bonnet. The screw plug 17 is provided with a cap 18 for enclosing the upper end of the plug. The cap bears against the upper end of the bonnet and thus serves also as a lock nut for the screw plug.

The body of the valve is provided with several screw-threaded nipple extensions 19, 20 and 21 for making conduit or pipe connections thereto. The nipple extensions 19 and 20 respectively, provide for making the oil supply pipe connection with the chamber 3 and a test gauge connection, the test gauge connection normally being sealed by a plug 22 seating against the end of the nipple 20 and held in place by a sleeve or union nut 23.

The nipple extension 21 serves for making an auxiliary steam pipe connection for admitting steam to the discharge passage 4 through an annular passage 24 in the body. The admission of steam into the discharge passage serves to atomize the discharged lubricant and also serves to supply steam for heating the valve particularly when used upon locomotive cylinders when the engine is at rest.

The nipple extension 21 for the steam line is provided with a combined check valve and coupling sleeve fitting 25 at one end screw-threaded into the nipple and on its opposite end tapped for making a pipe connection. The fitting has a reduced diameter bore portion into which a choke plug 26 is mounted with a spring pressed ball valve 28 interposed therebetween and normally seating against the plug 26 to seal against the escape pressures from the discharge conduit or passage.

As shown in Figure 1, the needle valve 6 is seated under the pressure of the spring 16 with the diaphragm 7 stressed and dished downwardly from a horizontal plane across the shoulder. After a sufficient quantity of the oil is pumped into the chamber 3 raising the oil pressure to a degree overcoming the pressure of the spring 16 the valve is unseated and a quantity of oil discharged from the chamber which immediately reduces the pressure in the chamber, whereupon the spring pressure again prevails closing the valve. The valve motion is very slight and practically never to a degree which would result in flexing the diaphragm to or beyond the horizontal plane, the maximum movement of the valve being governed by the flange 12 of a follower encountering the base surface of the recess in the end of the bonnet. This is limited so that the maximum movement could not compress the diaphragm to or beyond the horizontal plane upwardly so that the diaphragm cannot be strained under the flexing pressure in the oil chamber over the anchoring edges of the parts securing the diaphragm in position in the valve. Therefore there is no opportunity for the diaphragm to be cut or ruptured nor become buckled or set as is the case under the prevailing structures of check valves in which the diaphragm flexes from the horizontal position upwardly or to either side of the horizontal for the full movement of the valve.

The follower having its flange or head surface shaped corresponding to the curvature of the diaphragm when dished or flexed when the valve is seated, presents the spring pressure over the entire unclamped surface of the diaphragm so that the entire area of the diaphragm exposed to the pressure of the oil is in bearing or supporting engagement with the follower, rendering it impossible for the diaphragm to be buckled by the pressure in the oil chamber and when flexed at its outer portion relieved from the counter-pressure of the spring and free to flex but incapable of being brought across any edge or openings which would have a tendency to cut, rupture or distort the diaphragm.

The diaphragm is installed in the body under a preferred method so as not to injure the diaphragm during the process of installation and this is accomplished as follows:

The diaphragm, follower, bushing and valve are as a unit secured together and then inserted into the body with the bonnet removed, seating the diaphragm upon the annular shoulder within the body after which the bonnet is applied but only partially screwed down without engaging the diaphragm. The spring is inserted within the bonnet and the plug screw brought down to compress the spring to a degree necessary for bringing the valve to its seat and hold the same in such seated position while the bonnet is screwed tightly into place securely clamping the diaphragm in position to seal against leakage after which the spring tension is again adjusted to give the necessary pressure required for the valve operation.

Having described my invention, I claim:

In a terminal check valve, a valve casing having a chamber with inlet and discharge passages, a metallic diaphragm marginally clamped within the casing and exposed to the pressure in said chamber, a valve carried by said diaphragm for opening and closing the discharge passage, a follower movable in the casing under pressure, and centrally secured to the diaphragm, said follower having a head surface engageable with the diaphragm and shaped correspondingly to the flexure of the diaphragm when deflected for seating the valve whereby the entire area of the diaphragm within its clamped margin is backed by the follower when the diaphragm is deflected for valve seating, thereby preventing distortion of the diaphragm while the valve is seated and during the period the pressure is being built up to the degree for flexing the diaphragm for valve unseating, and the follower movement for valve unseating confined to prevent diaphragm flexure to or beyond the plane of the clamped margins of the diaphragm.

In witness whereof, I hereunto subscribe my name.

ELMER O. COREY.